United States Patent [19]

Matsuoka

[11] Patent Number: 4,979,807
[45] Date of Patent: Dec. 25, 1990

[54] BIASPHERICAL SINGLE LENS FOR AN OPTICAL INFORMATION RECORDING-REPRODUCING APPARATUS

[75] Inventor: Kazuhiko Matsuoka, Yokohama, Japan

[73] Assignee: Canon Kabushiki Kaisha, Tokyo, Japan

[21] Appl. No.: 507,580

[22] Filed: Apr. 11, 1990

[30] Foreign Application Priority Data

Apr. 12, 1989 [JP] Japan .................................. 1-94038
Apr. 12, 1989 [JP] Japan .................................. 1-94039

[51] Int. Cl.$^5$ ............................................. G02B 13/18
[52] U.S. Cl. .................................................. 350/432
[58] Field of Search ................ 350/432, 433, 434, 435

[56] References Cited

U.S. PATENT DOCUMENTS

| | | | |
|---|---|---|---|
| 4,027,952 | 6/1977 | Hugues | 350/432 |
| 4,449,792 | 5/1984 | Arai et al. | 350/432 |
| 4,571,034 | 2/1986 | Nakamura | 350/432 |
| 4,641,929 | 2/1987 | Braat | 350/432 |
| 4,743,093 | 5/1988 | Oinan | 350/432 |
| 4,765,723 | 8/1988 | Takamura | 350/432 |
| 4,768,867 | 9/1988 | Suda | 350/432 |
| 4,842,388 | 6/1989 | Tanaka et al. | 350/432 |
| 4,902,113 | 2/1990 | Ishiwara | 350/432 |
| 4,902,114 | 2/1990 | Arai | 350/432 |

*Primary Examiner*—Scott J. Sugarman
*Attorney, Agent, or Firm*—Fitzpatrick, Cella, Harper & Scinto

[57] ABSTRACT

A biaspherical single lens for an optical information recording-reproducing apparatus comprises a single lens forming an image through a substrate of thickness t and having its first and second surfaces both formed by an aspherical surface and in which when the distance from any point on the aspherical surface to the tangential plane of the vertex of the aspherical surface is X and the distance from said any point to the optic axis is H and the reference radius of curvature of the $\nu$th surface is $R_\nu$ and the cone constant of the $\nu$th surface is $K_\nu$ and the aspherical coefficient of the $\nu$th surface is $A_{\nu i}$ ($i=3, 4, \ldots$), the aspherical surface is an aspherical surface expressed by the following equation and satisfies the following conditions (1), (2), (3) and (4):

$$X = \frac{H^2/R_\nu}{1 + \sqrt{1 - (1 + K_\nu)(H/R_\nu)^2}} + A_{\nu 3}H^3 + A_{\nu 4}H^4 + \ldots \; (\nu = 1,2).$$

$$0.36 < \frac{t}{F} < 0.46 \quad (1)$$

$$0.60 < \frac{(N-1)F^3}{N^2 R_1^3} < 1.15 \quad (2)$$

$$0.30 < \frac{(N-1)D}{NR_1} < 0.45 \quad (3)$$

$$-0.65 < \frac{R_1}{R_2} < -0.26 \quad (4)$$

where F is the focal length of the aspherical single lens, D is the thickness on the optic axis of the aspherical single lens, and N is the refractive index of the aspherical single lens for the wavelength used.

4 Claims, 5 Drawing Sheets

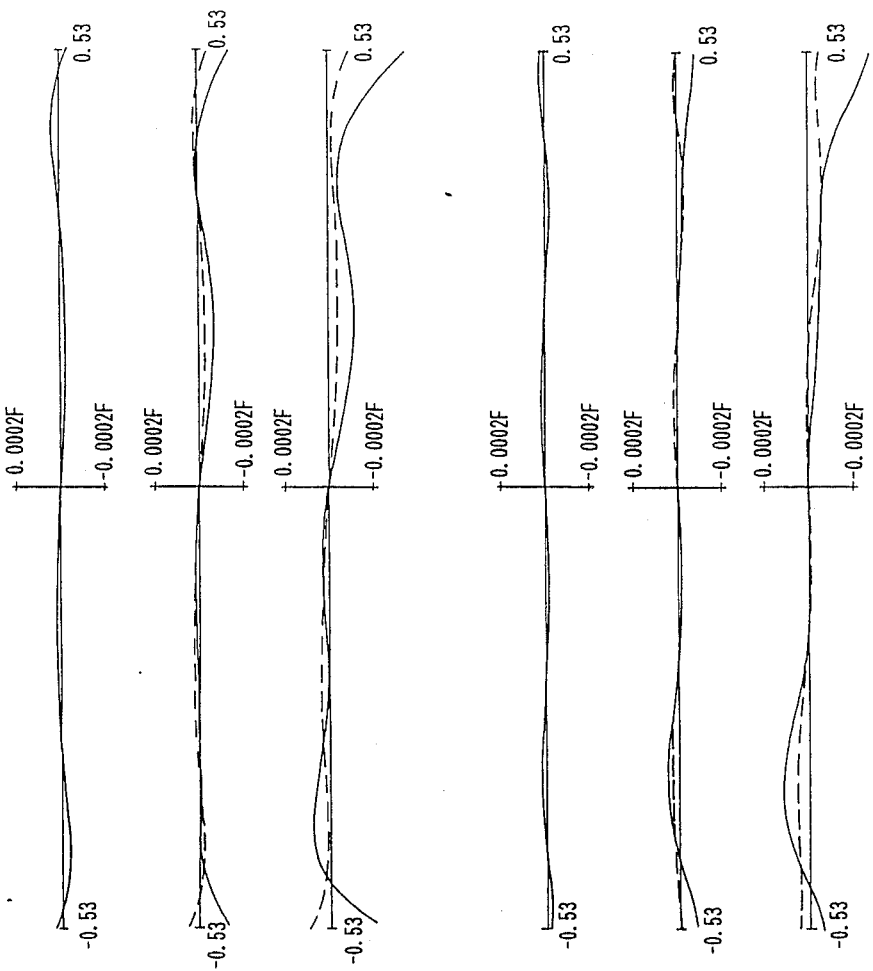

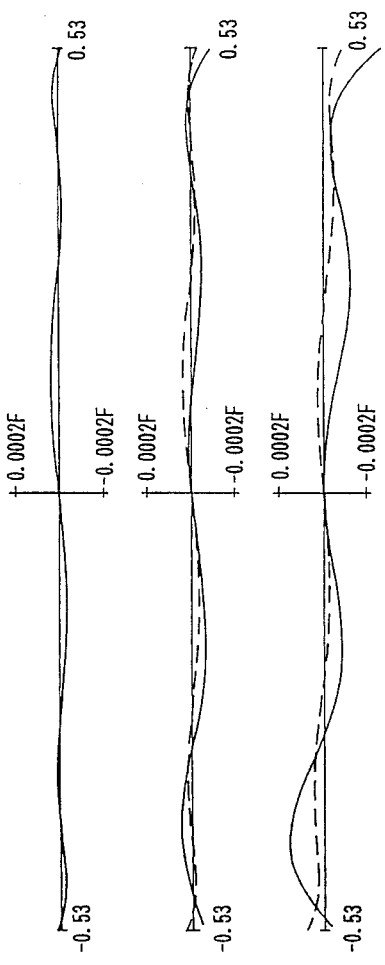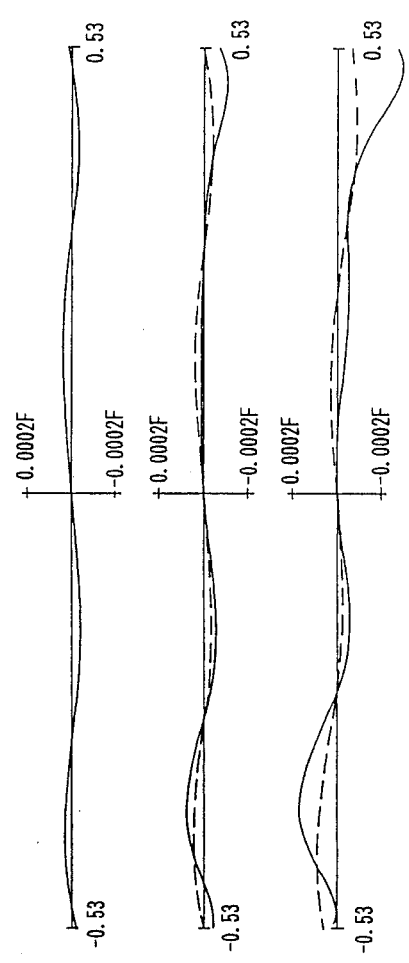
FIG. 4A
FIG. 4B
FIG. 4C
FIG. 5A
FIG. 5B
FIG. 5C

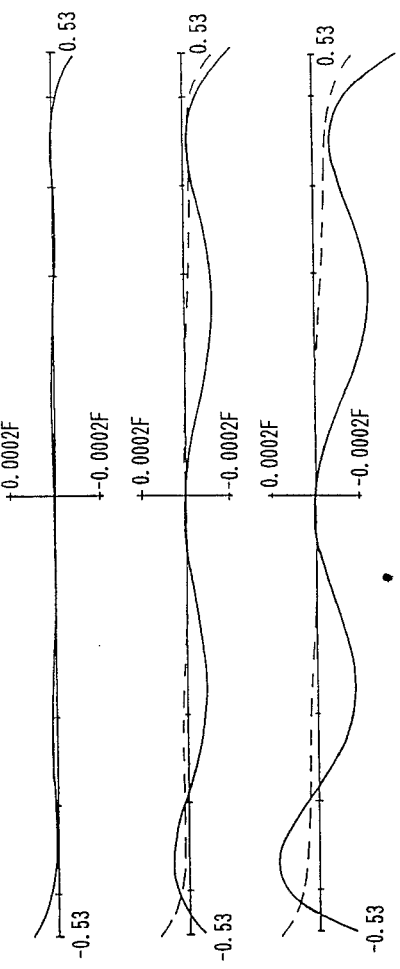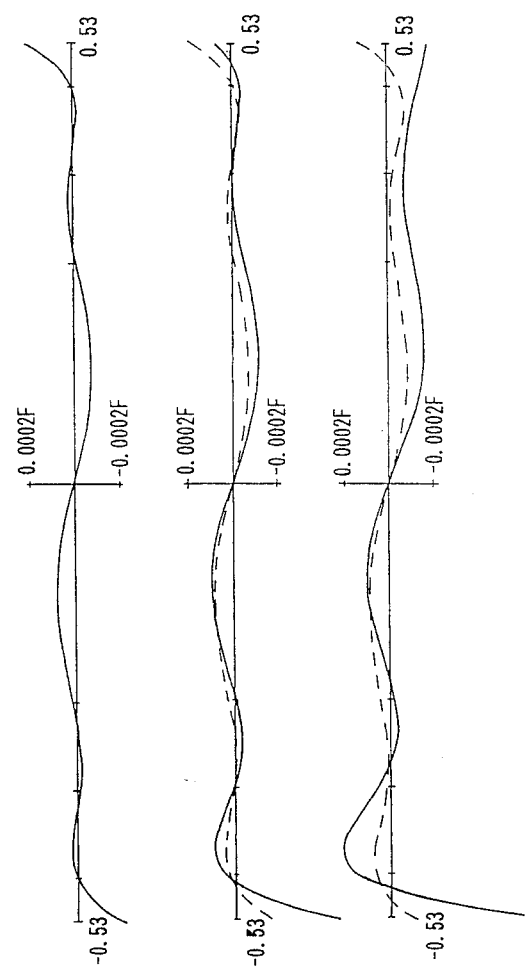
FIG. 6A
FIG. 6B
FIG. 6C
FIG. 7A
FIG. 7B
FIG. 7C

BIASPHERICAL SINGLE LENS FOR AN OPTICAL INFORMATION RECORDING-REPRODUCING APPARATUS

BACKGROUND AND SUMMARY OF THE INVENTION

This invention relates to a biaspherical single lens for use in an optical head in an optical information recording-reproducing apparatus, and in particular relates to a very bright biaspherical single lens having NA of the order of 0.53.

In recent years, optical disks such as video disks, compact disks and magneto-optical disks as optical memories have been widely used as information recording carriers of large memory capacity.

To accurately record information highly densely on an information recording carrier of this kind and/or accurately reproduce recorded information therefrom, a resolving power of 1-2 μm is required as the on-axis performance and the off-axis performance of the order of 0.5° of an objective lens used in an optical information recording-reproducing apparatus. That is, an objective lens of NA of the order of 0.53 is necessary.

Also in the objective lens with such use, it is necessary to secure a sufficient spacing between the surface of a carrier such as an optical disk and the objective lens to thereby prevent the contact between the two and avoid damage to the recording carrier and the objective lens.

Further, in the above-described information recording-reproducing apparatus, the main current is a system in which the objective lens is moved in the direction of the optic axis or in a direction orthogonal to the direction of the optic axis to effect auto focusing or auto tracking. Consequently, in order to improve the response characteristic, compactness and light weight are required of the objective lens of this kind.

Heretofore, in Japanese Laid-Open Patent Application No. 58-42021, Japanese Laid-Open Patent Application No. 58-208719, Japanese Laid-Open Patent Application No. 60-122915, etc., a lens system comprising a four-group construction has been disclosed as the objective lens of this kind.

However, the objective lens shown in these laid-open publications is great in the full length of the lens system and cannot achieve the aforementioned compactness and light weight.

In order to eliminate the above-noted disadvantage, development of an aspherical single lens has recently been carried out actively, and the technique thereof is disclosed, for example, in Japanese Laid-Open Patent Application No. 57-201210, Japanese Laid-Open Patent Application No. 58-68711, Japanese Laid-Open Patent Application No. 59-23313, Japanese Laid-Open Patent Application No. 59-26714, Japanese Laid-Open Patent Application No. 61-2117, Japanese Laid-Open Patent Application No. 61-11715, Japanese Laid-Open Patent Application No. 61-56314, U.S. Pat. No. 4,027,952, U.S. Pat. No. 4,449,792, U.S. Pat. No. 4,571,034, U.S. Pat. No. 4,743,093, etc.

In the embodiments of the aspherical single lens shown in these publications, when the focal length of the lens is F, the thickness t of the transparent protective layer of a recording carrier to which the lenses shown in the embodiments are applicable is of the order of 0.26F–0.28F. However, to further improve the above-mentioned auto focusing and auto tracking operations, a lens of shorter focal length is desired in respect of compactness and light weight. Further, considering on the basis of the same NA, making the focal length of the lens shorter is equivalent to making the effective light beam diameter smaller, and it is possible to make other optical parts such as prisms in the optical head used in the optical information recording-reproducing apparatus smaller in size and as a result, it becomes possible to make the entire optical head light in weight, compact and thin. Accordingly, this is desirable for the higher speed of the movement of the optical head in the radial direction of the optical disk, i.e., the seek operation.

It is an object of the present invention to eliminate the above-noted disadvantages peculiar to the prior art and to provide a biaspherical single lens for an optical information recording-reproducing apparatus which is as bright as NA of the order of 0.53 and yet has a good imaging performance both on the axis and off the axis.

The above object of the present invention is achieved by the biaspherical single lens of the present invention which will hereinafter be described.

The biaspherical single lens of the present invention for forming an image through a substrate of thickness t is a biaspherical single lens having its first and second surfaces both formed by an aspherical surface and in which when the distance from any point on the aspherical surface to the tangential plane of the vertex of the aspherical surface is X and the distance from said any point to the optic axis is H and the reference radius of curvature of the $\nu$th surface (the radius of curvature of the vertex) is $R\nu$ and the cone constant of the $\nu$th surface is $K\nu$ and the aspherical coefficient of the $\nu$th surface is $A\nu i$ (i=3, 4, ...), the aspherical surface is an aspherical surface expressed by the following equation and satisfies the following conditions (1), (2), (3) and (4):

$$X = \frac{H^2/R_\nu}{1 + \sqrt{1 - (1 + K_\nu)(H/R_\nu)^2}} + A_{\nu 3}H^3 + A_{\nu 4}H^4 + \ldots \quad (\nu = 1,2)$$

$$0.36 < \frac{t}{F} < 0.46 \quad (1)$$

$$0.60 < \frac{(N-1)F^3}{N^2 R_1^3} < 1.15 \quad (2)$$

$$0.30 < \frac{(N-1)D}{NR_1} < 0.45 \quad (3)$$

$$-0.65 < \frac{R_1}{R_2} < -0.26 \quad (4)$$

where F is the focal length of the aspherical single lens, t is the thickness of the substrate, D is the thickness on the optic axis of the aspherical lens, and N is the refractive index of the aspherical single lens for the wavelength used.

BRIEF DESCRIPTION OF THE DRAWINGS

FIGS. 2 to 9 show the lateral aberrations of embodiments of the present invention.

DESCRIPTION OF THE PREFERRED EMBODIMENTS

Figure 1:
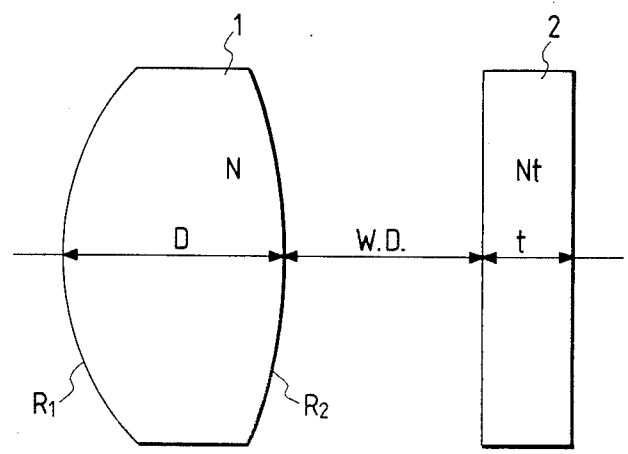
FIG. 1 shows the lens cross-section of a biaspherical single lens according to the present invention.

The biaspherical single lens according to the present invention is a biaspherical single lens for an optical information recording-reproducing apparatus which forms an image through a substrate of thickness t and which has its first and second surfaces both formed by an aspherical surface and in which when the distance from any point on the aspherical surface to the tangential plane of the vertex of the aspherical surface is X and the distance from said any point to the optic axis is H and the reference radius of curvature of the $\nu$th surface (the radius of curvature of the vertex) is $R\nu$ and the cone constant of the $\nu$th surface is $K\nu$ and the aspherical coefficient of the $\nu$th surface is $A\nu i$ (i = 3, 4, ...), the aspherical surface is an aspherical surface expressed by the following equation and satisfies the following conditions (1), (2), (3) and (4):

$$X = \frac{H^2/R_\nu}{1 + \sqrt{1 - (1 + K_\nu)(H/R_\nu)^2}} + A_{\nu 3}H^3 + A_{\nu 4}H^4 + \ldots \quad (\nu = 1, 2)$$

$$0.36 < \frac{t}{F} < 0.46 \quad (1)$$

$$0.60 < \frac{(N-1)F^3}{N^2 R_1^3} < 1.15 \quad (2)$$

$$0.30 < \frac{(N-1)D}{NR_1} < 0.45 \quad (3)$$

$$-0.65 < \frac{R_1}{R_2} < -0.26 \quad (4)$$

where F is the focal length of the aspherical single lens, D is the thickness on the optic axis of the aspherical single lens, and N is the refractive index of the aspherical single lens for the wavelength used.

The conditions (1) to (4) will now be described.

The condition (1) of the present invention has been found out with the physical conditions when the biaspherical single lens of the present invention is used in an optical information recording-reproducing apparatus taken into account. That is, if the lower limit value of the condition (1) is exceeded, it is against the shorter focal length which is the subject of the present invention, and is unsuitable for lighter weight and compactness. On the other hand, if the upper limit value of the condition (1) is exceeded, the spacing between an objective lens and a recording carrier (the working distance) becomes too short, and when an extraneous unexpected force or vibration is applied to the optical information recording-reproducing apparatus during its operation, the recording carrier and the objective lens may come into contact with each other, whereby they may be destroyed. Therefore, where a shorter focal length is aimed at while a sufficient working distance is secured, it is necessary for obtaining a good imaging performance that the condition (1) be satisfied while the conditions (2)–(4) shown below are satisfied.

The conditions (2) and (3) of the present invention are for correcting spherical aberration and coma well in a tertiary area.

According to Yoshiya Matsui, *Lens Designing Method* (Kyoritsu Publishing Co., Ltd), the tertiary spherical aberration coefficients $I_1$ and $I_2$ of the first and second surfaces, respectively, and the coma coefficients $II_1$ and $II_2$ of the first and second surfaces, respectively, are expressed as follows when the entrance pupil is made coincident with the first surface and the object distance is infinity.

$$I_1 = \left(\frac{1}{R_1}\right)^2 \left(\frac{N-1}{N^2 R_1}\right) + \phi_1$$

$$I_2 = \left(1 - \frac{D}{N}\frac{N-1}{R_1}\right)\left[\left(1 - \frac{D}{N}\frac{N-1}{R_1}\right)\frac{N}{R_2} - \frac{N-1}{R_1}\right]^2$$

$$\left(1 - \frac{N-1}{N^2 R_1}\right) + \left(1 - \frac{D}{N}\frac{N-1}{R_1}\right)\phi_2$$

$$II_1 = \frac{N-1}{N^2 R_1^2}$$

$$II_2 = \left(1 - \frac{D}{N}\frac{N-1}{R_1}\right)\left[\left(1 - \frac{D}{N}\frac{N-1}{R_1}\right)\frac{N}{R_2} - \frac{N-1}{R_1}\right]$$

$$\left(\frac{D}{R_2} + 1\right)\left(1 - \frac{N-1}{N^2 R_1}\right) + \left(1 - \frac{D}{N}\frac{N-1}{R_1}\right)^3 \frac{D}{N}\phi_2$$

where $\phi_1$ and $\phi_2$ are the tertiary aspherical terms of the first and second surfaces, respectively, $R_1$ is the paraxial radius of curvature of the first surface, and $R_2$ is the paraxial radius of curvature of the second surface.

The tertiary spherical aberration coefficient I and coma coefficient II of the entire lens are determined by the sums of the aberration coefficients of the respective surfaces $I = I_1 + I_2$ $II = II_1 + II_2$ and the shape of the lens and each aspherical amount are determined so that I and II may assume appropriate values.

As is apparent from the above-mentioned equations, when the shape (such as the focal length and working distance) of the lens is determined, the values of $R_1$, $R_2$, D and N are substantially determined, and the degree of freedom left to make the aberration coefficients I and II into appropriate values is only $\phi_1$ and $\phi_2$. Accordingly, it is necessary that the shape of the lens be determined with aberration correction taken into account to a certain degree, and the numerical value ranges therefor are the conditions (2) and (3).

If the numerical value range of the condition (2) is departed from, the spherical aberration particularly of the first surface will become great and the aberration cannot be completely corrected by the aspherical term $\phi_1$ of the first surface.

The condition (3) is a condition for correcting coma well-balancedly by the second surface, and if the numerical value range of this condition is departed from, aberration cannot be completely corrected by the aspherical term $\phi_2$ of the second surface and the off-axis imaging performance will be remarkably deteriorated.

The condition (4) is a condition for satisfying chiefly the sine condition. In the present invention, together with the on-axis aberrations, the off-axis aberrations within a predetermined range, particularly, coma, is corrected well, but if the range of the condition (4) is departed from, the isoplanatic condition will be remarkably lost, and this is not preferable. If the upper limit of this condition is exceeded, the radius of curvature of the first surface will become too small, and this leads to the disadvantages that negative spherical aberration occurs greatly and aberration correction becomes difficult and that the working distance W.D. becomes short and a difficulty in practical use arises.

Some embodiments of the biaspherical single lens of the present invention will be shown below.

However, as shown in FIG. 1, F is the focal length of the lens 1, NA is the numerical aperture, $\beta$ is the paraxial lateral magnification, $R_1$ is the paraxial radius of curvature of the first aspherical surface, $R_2$ is the paraxial radius of curvature of the second aspherical surface, D is the center thickness of the lens 1, W.D. is the working distance, t is the thickness of a recording carrier substrate 2, N is the refractive index of the lens 1 for the wavelength $\lambda = 780$ nm used, $N_t$ is the reactive index of the recording carrier substrate 2 for the wavelength $\lambda = 780$ nm used, and $\Delta\nu(j)(\nu=1, 2)$ is the difference in the direction of the optic axis between the aspherical surface at j% in the effective diameter of the lens determined in the $\nu$th surface by NA (numerical aperture) and the spherical surface having a paraxial radius of curvature $R\nu$ (but as regards $\Delta\nu(j)$, the direction in which the curvature of the aspherical surface becomes weaker is positive).

When the distance from any point on the aspherical surface to the tangential plane of the vertex of the aspherical surface is X and the distance from said any point to the optic axis is H and the reference radius of curvature of the $\nu$th surface (the radius of curvature of the vertex) is $R\nu$ and the cone constant of the $\nu$ surface is $K\nu$ and the aspherical coefficient of the $\nu$the surface is $A\nu i$ (i=3,4,...), the shape of the aspherical surface is that of an aspherical surface expressed by the following equation:

$$X + \frac{H^2/R_1}{1 + \sqrt{1 - (1 + K_\nu)(H/R_\nu)^2}} +$$

$$A_{\nu 3}H^3 + A_{\nu 4}H^4 + \ldots (\nu = 1, 2)$$

The lateral aberrations of lenses of Embodiments 1 to 4 of the present invention are shown in FIGS. 2 to 5, respectively. Each embodiment and each aberration graph are those when the focal length is normalized to F = 1.0. In the aberration graphs shown in FIGS. 2 to 5, the horizontal axis corresponds to the radius of the entrance pupil, and the vertical axis represents the amount of aberration. Further, (A) is the on-axis imaging characteristic, and (B) and (C) are the off-axis imaging characteristics corresponding to angles of view 0.4° and 0.8°, respectively. The solid lines represent the lateral aberrations of the meridonal plane, and the broken lines represent the lateral aberrations of the sagittal plane.

EMBODIMENT 1

| | | |
|---|---|---|
| F = 1.0 | NA = 0.53 | $\beta = 0$ |
| $R_1 = 0.71950$ | D = 0.80271 | N = 1.57645 |
| $R_2 = -1.71660$ | WD = 0.32109 | |
| | t = 0.42811 | $N_t = 1.58$ |
| $K_1 = -1.83127 \times 10^{-2}$ | | $K_2 = -1.59047 \times 10^1$ |
| $A_{13} = 6.13521 \times 10^{-3}$ | | $A_{23} = 4.75410 \times 10^{-2}$ |
| $A_{14} = -1.75084 \times 10^{-1}$ | | $A_{24} = 9.54095 \times 10^{-2}$ |
| $A_{15} = 1.10047 \times 10^{-1}$ | | $A_{25} = 2.99007 \times 10^{-1}$ |
| $A_{16} = -7.75959 \times 10^{-1}$ | | $A_{26} = -1.66104 \times 10^0$ |
| $A_{17} = 4.82531 \times 10^{-1}$ | | $A_{27} = -1.43306 \times 10^0$ |
| $A_{18} = 3.91327 \times 10^{-1}$ | | $A_{28} = 3.61485 \times 10^0$ |
| $A_{19} = -1.23485 \times 10^0$ | | $A_{29} = -4.45362 \times 10^0$ |
| $A_{110} = -4.27468 \times 10^0$ | | $A_{210} = 1.52907 \times 10^0$ |
| $A_{111} = 1.19932 \times 10^1$ | | $A_{211} = 6.43103 \times 10^1$ |
| $A_{112} = -1.78222 \times 10^1$ | | $A_{212} = 3.78247 \times 10^1$ |
| $A_{113} = -8.13893 \times 10^{-1}$ | | $A_{213} = 5.65608 \times 10^1$ |
| $A_{114} = 2.02031 \times 10^1$ | | $A_{214} = 8.57628 \times 10^1$ |
| $A_{115} = 2.65724 \times 10^1$ | | $A_{215} = -1.41495 \times 10^3$ |
| $A_{116} = -5.21685 \times 10^1$ | | $A_{216} = -8.63734 \times 10^2$ |
| $\dfrac{(N-1)F^3}{N^2 R_1^3} = 0.62$ | | $\dfrac{(N-1)D}{NR_1} = 0.41$ |
| $\dfrac{R_1}{R_2} = -0.42$ | | $\dfrac{t}{D+WD} = 0.38$ |
| $\Delta_1 (10) = 0.2329$ | | $\Delta_2 (10) = -0.0408$ |
| $\Delta_1 (9) = 0.1808$ | | $\Delta_2 (9) = -0.0330$ |
| $\Delta_1 (7) = 0.1030$ | | $\Delta_2 (7) = -0.0199$ |
| $\Delta_1 (5) = 0.0506$ | | $\Delta_2 (5) = -0.0101$ |
| $\dfrac{\Delta_1 (10)}{\Delta_2 (10)} = -5.7$ | | $\dfrac{\Delta_1 (7)}{\Delta_2 (7)} = -5.2$ |

EMBODIMENT 2

| | | |
|---|---|---|
| F = 1.0 | NA = 0.53 | $\beta = 0$ |
| $R_1 = 0.69795$ | D = 0.73260 | N = 1.57645 |
| $R_2 = -2.04045$ | WD = 0.36326 | |
| | t = 0.39960 | $N_t = 1.58$ |
| $K_1 = -1.66870 \times 10^{-2}$ | | $K_2 = -2.04779 \times 10^1$ |
| $A_{13} = 6.00268 \times 10^{-3}$ | | $A_{23} = 4.48359 \times 10^{-2}$ |
| $A_{14} = -1.75527 \times 10^{-1}$ | | $A_{24} = 1.17807 \times 10^{-1}$ |
| $A_{15} = 5.74300 \times 10^{-2}$ | | $A_{25} = -2.73550 \times 10^{-1}$ |
| $A_{16} = -8.91824 \times 10^{-1}$ | | $A_{26} = 2.33495 \times 10^{-3}$ |
| $A_{17} = 8.38701 \times 10^{-1}$ | | $A_{27} = -4.14235 \times 10^{-1}$ |
| $A_{18} = 4.44347 \times 10^{-1}$ | | $A_{28} = 2.14899 \times 10^0$ |
| $A_{19} = -1.12904 \times 10^0$ | | $A_{29} = -6.16208 \times 10^0$ |
| $A_{110} = -6.50903 \times 10^0$ | | $A_{210} = 3.41262 \times 10^0$ |
| $A_{111} = 1.72591 \times 10^1$ | | $A_{211} = 1.04277 \times 10^1$ |
| $A_{112} = -3.51144 \times 10^1$ | | $A_{212} = 2.84796 \times 10^1$ |
| $A_{113} = 7.77967 \times 10^0$ | | $A_{213} = -2.84760 \times 10^1$ |
| $A_{114} = 4.97410 \times 10^1$ | | $A_{214} = 1.90557 \times 10^2$ |
| $A_{115} = 6.30945 \times 10^1$ | | $A_{215} = -1.39967 \times 10^2$ |
| $A_{116} = -1.55214 \times 10^2$ | | $A_{216} = -1.14889 \times 10^3$ |
| $\dfrac{(N-1)F^3}{N^2 R_1^3} = 0.68$ | | $\dfrac{(N-1)D}{NR_1} = 0.38$ |
| $\dfrac{R_1}{R_2} = -0.34$ | | $\dfrac{t}{D+WD} = 0.37$ |
| $\Delta_1 (10) = 0.2438$ | | $\Delta_2 (10) = -0.0369$ |
| $\Delta_1 (9) = 0.1884$ | | $\Delta_2 (9) = -0.0299$ |
| $\Delta_1 (7) = 0.1068$ | | $\Delta_2 (7) = -0.0180$ |
| $\Delta_1 (5) = 0.0523$ | | $\Delta_2 (5) = -0.0092$ |
| $\dfrac{\Delta_1 (10)}{\Delta_2 (10)} = -6.6$ | | $\dfrac{\Delta_1 (7)}{\Delta_2 (7)} = -5.9$ |

EMBODIMENT 3

| | | |
|---|---|---|
| F = 1.0 | NA = 0.53 | $\beta = 0$ |
| $R_1 = 0.70210$ | D = 0.77110 | N = 1.57645 |

-continued $R_2 = -1.92752 \quad WD = 0.34651$
$t = 0.39799 \quad N_t = 1.58$

| | |
|---|---|
| $K_1 = -1.33380 \times 10^{-2}$ | $K_2 = -5.00000 \times 10^1$ |
| $A_{13} = 4.99151 \times 10^{-3}$ | $A_{23} = 2.98063 \times 10^{-2}$ |
| $A_{14} = -1.36020 \times 10^{-1}$ | $A_{24} = 2.81447 \times 10^{-2}$ |
| $A_{15} = 7.66103 \times 10^{-2}$ | $A_{25} = -4.24791 \times 10^{-1}$ |
| $A_{16} = -9.98758 \times 10^{-1}$ | $A_{26} = -2.09939 \times 10^{-1}$ |
| $A_{17} = 8.47942 \times 10^{-1}$ | $A_{27} = 3.13074 \times 10^{-2}$ |
| $A_{18} = 6.53046 \times 10^{-1}$ | $A_{28} = 2.21370 \times 10^{0}$ |
| $A_{19} = -1.26724 \times 10^{0}$ | $A_{29} = -2.02453 \times 10^{0}$ |
| $A_{110} = -7.04004 \times 10^{0}$ | $A_{210} = 4.48568 \times 10^{0}$ |
| $A_{111} = 1.81251 \times 10^{1}$ | $A_{211} = 7.40823 \times 10^{0}$ |
| $A_{112} = -3.67438 \times 10^{1}$ | $A_{212} = 2.97764 \times 10^{1}$ |
| $A_{113} = 7.21812 \times 10^{0}$ | $A_{213} = -6.96801 \times 10^{0}$ |
| $A_{114} = 5.41030 \times 10^{1}$ | $A_{214} = 2.21248 \times 10^{2}$ |
| $A_{115} = 6.80399 \times 10^{1}$ | $A_{215} = -6.51546 \times 10^{1}$ |
| $A_{116} = -1.58810 \times 10^{2}$ | $A_{216} = -2.16974 \times 10^{3}$ |

$\frac{(N-1)F^3}{N^2 R_1^3} = 0.67 \qquad \frac{(N-1)D}{NR_1} = 0.40$ $\frac{R_1}{R_2} = -0.36 \qquad \frac{t}{D+WD} = 0.36$ $\Delta_1(10) = 0.2416 \qquad \Delta_2(10) = -0.0367$
$\Delta_1(9) = 0.1869 \qquad \Delta_2(9) = -0.0297$
$\Delta_1(7) = 0.1060 \qquad \Delta_2(7) = -0.0179$
$\Delta_1(5) = 0.0519 \qquad \Delta_2(5) = -0.0091$ $\frac{\Delta_1(10)}{\Delta_2(10)} = -6.6 \qquad \frac{\Delta_1(7)}{\Delta_2(7)} = -5.9$

EMBODIMENT 4

$F = 1.0 \qquad NA = 0.53 \qquad \beta = 0$
$R_1 = 0.67962 \qquad D = 0.61097 \qquad N = 1.57645$
$R_2 = -2.54902 \qquad WD = 0.43340$
$t = 0.37584 \qquad N_t = 1.58$

| | |
|---|---|
| $K_1 = -1.37686 \times 10^{-2}$ | $K_2 = -4.56598 \times 10^1$ |
| $A_{13} = 2.49235 \times 10^{-2}$ | $A_{23} = 6.18193 \times 10^{-2}$ |
| $A_{14} = -2.46348 \times 10^{-1}$ | $A_{24} = 9.45675 \times 10^{-2}$ |
| $A_{15} = 1.65190 \times 10^{-1}$ | $A_{25} = -1.03845 \times 10^{0}$ |
| $A_{16} = -1.11976 \times 10^{0}$ | $A_{26} = 2.51153 \times 10^{-1}$ |
| $A_{17} = 1.47487 \times 10^{0}$ | $A_{27} = 1.01118 \times 10^{1}$ |
| $A_{18} = -3.50309 \times 10^{-2}$ | $A_{28} = -2.00478 \times 10^{1}$ |
| $A_{19} = -3.79524 \times 10^{0}$ | $A_{29} = -1.74017 \times 10^{1}$ |
| $A_{110} = -5.90336 \times 10^{0}$ | $A_{210} = 3.71507 \times 10^{1}$ |
| $A_{111} = 3.17133 \times 10^{1}$ | $A_{211} = 6.98481 \times 10^{1}$ |
| $A_{112} = -7.08127 \times 10^{1}$ | $A_{212} = 1.12915 \times 10^{2}$ |
| $A_{113} = 1.27092 \times 10^{1}$ | $A_{213} = -4.84307 \times 10^{2}$ |
| $A_{114} = 1.15587 \times 10^{2}$ | $A_{214} = 3.47351 \times 10^{2}$ |
| $A_{115} = 1.50075 \times 10^{2}$ | $A_{215} = 4.12185 \times 10^{2}$ |
| $A_{116} = -3.74926 \times 10^{2}$ | $A_{216} = 5.32755 \times 10^{1}$ |

$\frac{(N-1)F^3}{N^2 R_1^3} = 0.74 \qquad \frac{(N-1)D}{NR_1} = 0.33$ $\frac{R_1}{R_2} = -0.27 \qquad \frac{t}{D+WD} = 0.36$ $\Delta_1(10) = 0.2542 \qquad \Delta_2(10) = -0.0348$
$\Delta_1(9) = 0.1955 \qquad \Delta_2(9) = -0.0282$
$\Delta_1(7) = 0.1102 \qquad \Delta_2(7) = -0.0170$
$\Delta_1(5) = 0.0538 \qquad \Delta_2(5) = -0.0087$ $\frac{\Delta_1(10)}{\Delta_2(10)} = -7.3 \qquad \frac{\Delta_1(7)}{\Delta_2(7)} = -6.5$ Embodiments 1 to 4 of the present invention have been shown above, and the imaging performances thereof are shown in FIGS. 2 to 5. In the above-described Embodiments 1 to 4, when the thickness t of the recording carrier substrate is 1.2 mm, the focal length corresponds to the order of 2.8 mm to 3.2 mm and is within the range of the aforedescribed condition (1). Thus, the compactness and light weight of the objective lens which are the objects of the present invention, and further the compactness and light weight of the optical head can be achieved.

In the above-described Embodiments 1 to 4, as the glass material, use has been made of one having a refractive index Nd=1.62299 for d-line and Abbe number 84 d =58.2.

In the biaspherical objective lenses as shown in the above-described Embodiments 1 to 4, it is preferable that in addition to the above-mentioned conditions (1) to (4), the following conditions (5) and (6) be satisfied:

$$0.60 < \frac{(N-1)F^3}{N^2 R_1^3} < 0.77 \qquad (5)$$

$$-0.46 < \frac{R_1}{R_2} < -0.26 \qquad (6)$$

The condition (5) is for correcting spherical aberration and coma better in the tertiary area.

If the numerical value range of the condition (5) is departed from, the spherical aberration particularly of the first surface will become great and aberrations cannot be completely corrected by the aspherical term $\phi_1$ of the first surface.

The condition (6) is a condition for more satisfying chiefly the sine condition. In the present invention, together with the on-axis aberrations, the off-axis aberrations within a predetermined range, particularly coma, is corrected well, but if the range of the condition (6) is departed from, the isoplanatic condition will be remarkably lost, and this is not preferable. If the upper limit of this condition is exceeded, the radius of curvature of the first surface will become too small, and this leads to the disadvantages that negative spherical aberration occurs greatly to make aberration correction difficult and that the working distance W.D. becomes short to cause a difficulty in practical use.

In the biaspherical objective lenses of the present invention as shown in the above-described Embodiments 1 to 4, it is preferable that in addition to the above-mentioned conditions (1) to (6), the following condition (7) be satisfied:

$$0.35 < \frac{t}{D+WD} < 0.45 \qquad (7)$$

The condition (7) is concerned in the structure and size of the optical head, and if the lower limit value of this condition is exceeded, it will lead to the bulkiness of the optical head, and this is not preferable. If on the other hand, the upper limit value of this condition is exceeded, the objective lens and the recording carrier will come too close to each other, and this is not preferable in respect of the safety during the occurrence of unexpected vibration or the like.

From the viewpoint of aberration correction, it is preferable that in addition to the above-mentioned conditions (1) to (6), the following conditions (8) and (9) be satisfied:

$$-7.5 < \frac{\Delta_1(10)}{\Delta_2(10)} < -5.0 \qquad (8)$$

-continued
$$-7.0 < \frac{\Delta_1(7)}{\Delta_2(7)} < -4.5 \quad (9)$$

The conditions (8) and (9) are the ratios between the amount of asphericity of the first surface and the amount of asphericity of the second surface at 100% and 70%, respectively, of the effective diameter. The above two conditions have been found out by converting the sharing of the amount of aberration correction in the first and second surfaces into the ratio between the amounts of asphericity. By the ranges of the conditions (8) and (9) being satisfied in addition to the conditions (1) to (6), it is possible to make both of the on-axis imaging performance and the off-axis imaging performance better.

Or from the viewpoint of aberration correction, it is preferable that in addition to the conditions (1) to (6), the following conditions (10) to (13) be satisfied, and it is more preferable that in addition, the following conditions (14) to (17) be satisfied together:

$$0.20F < \Delta_1(10) < 0.28F \quad (10)$$

$$0.09F < \Delta_1(7) < 0.12F \quad (11)$$

$$-0.045F < \Delta_2(10) < -0.03F \quad (12)$$

$$-0.022F < \Delta_2(7) < -0.015F \quad (13)$$

$$0.16F < \Delta_1(9) < 0.22F \quad (14)$$

$$0.045F < \Delta_1(5) < 0.06F \quad (15)$$

$$-0.035F < \Delta_2(9) < -0.025F \quad (16)$$

$$-0.012 < \Delta_2(5) < -0.005F \quad (17)$$

The above-mentioned conditions (10) to (13) are conditions for determining the amounts of asphericity at 100% and 70% of the effective diameters of the first and second surfaces of the lens. Likewise, the conditions (14) to (17) are conditions for determining the amounts of asphericity at 90% and 50%, and together with the conditions (10) to (13), they disclose more preferable conditions for aberration correction.

If the upper limit values of the conditions (10), (11), (14) and (15) are exceeded, spherical aberration will become over, and if conversely, the lower limit values of these conditions are exceeded, spherical aberration will become under and the on-axis performance will be deteriorated.

The conditions (12), (13), (16) and (17) are conditions concerned chiefly in the correction of off-axis aberration. If the ranges of these conditions are departed from, the amount of occurrence particularly of coma will become great, and this is not preferable.

Further embodiments of the biaspherical single lens of the present invention will be shown below.

However, as shown in FIG. 1, F is the focal length of the lens 1, NA is the numerical aperture, $\beta$ is the paraxial lateral magnification, R1 is the paraxial radius of curvature of the first aspherical surface, R2 is the paraxial radius of curvature of the second aspherical surface, D is the center thickness of the lens 1, W.D. is the working distance, t is the thickness of the recording carrier substrate 2, N is the refractive index of the lens 1 for the wavelength $\lambda = 780$ nm used, $N_t$ is the refractive index of the recording carrier substrate 2 for the wavelength $\lambda = 780$ nm used, and $\Delta\nu(j)(\nu = 1, 2)$ is the difference in the direction of the optic axis between the aspherical surface at j% in the effective diameter of the lens determined in the $\nu$th surface by NA (numerical aperture and the spherical surface having a paraxial radius of curvature $R\nu$ (but as regards $\frac{1}{3}\nu(j)$, the direction in which the curvature of the aspherical surface becomes weaker is positive).

When the distance from any point on the aspherical surface to the tangential plane of the vertex of the aspherical surface is X and the distance from said any point to the optic axis is H and the reference radius of curvature of the $\nu$th surface (the radius of curvature of the vertex) is $R\nu$ and the cone constant of the $\nu$th surface is $K\nu$ and the aspherical coefficient of the $\nu$th surface is $A\nu_i$ (i = 3, 4, ...), the shape of the aspherical surface is that of an aspherical surface expressed by the following equation:

$$X + \frac{H^2/R_1}{1 + \sqrt{1 - (1 + K_\nu)(H/R_\nu)^2}} +$$

$$A_{\nu 3}H^3 + A_{\nu 4}H^4 + \ldots (\nu = 1, 2)$$

The lateral aberrations of the lenses of Embodiments 5 to 8 of the present invention are shown in FIGS. 6 to 9, respectively. Each embodiment and each aberration graph are those when the focal length is normalized to $F = 1.0$. In the aberration graphs shown in FIGS. 6 to 9, the horizontal axis corresponds to the radius of the entrance pupil, and the vertical axis represents the amount of aberration. Further, (A) is the on-axis imaging characteristic, and (B) and (C) are the off-axis imaging characteristics corresponding to angles of view 0.4° and 0.8°, respectively. The solid lines represent the lateral aberrations of the meridional plane, and the broken lines represent the lateral aberrations of the sagittal plane.

EMBODIMENT 5

| | | |
|---|---|---|
| $F = 1.0$ | $NA = 0.53$ | $\beta = 0$ |
| $R_1 = 0.60184$ | $D = 0.74541$ | $N = 1.43569$ |
| $R_2 = -0.98504$ | $WD = 0.36313$ | |
| | $t = 0.41237$ | $N_t = 1.58$ |
| $K_1 = -1.02905 \times 10^{-1}$ | $K_2 = -2.83627 \times 10^1$ | |
| $A_{13} = -4.38646 \times 10^{-2}$ | $A_{23} = -1.22094 \times 10^{-1}$ | |
| $A_{14} = 2.29047 \times 10^{-1}$ | $A_{24} = -4.31884 \times 10^{-1}$ | |
| $A_{15} = -1.43915 \times 10^0$ | $A_{25} = -2.69744 \times 10^{-1}$ | |
| $A_{16} = 1.42430 \times 10^0$ | $A_{26} = 6.10131 \times 10^0$ | |
| $A_{17} = -8.84639 \times 10^{-2}$ | $A_{27} = -9.61272 \times 10^{-1}$ | |
| $A_{18} = -3.28062 \times 10^0$ | $A_{28} = -4.60242 \times 10^1$ | |
| $A_{19} = -3.22736 \times 10^0$ | $A_{29} = 5.76117 \times 10^1$ | |
| $A_{110} = 2.19391 \times 10^0$ | $A_{210} = 2.48523 \times 10^1$ | |
| $A_{111} = 1.07349 \times 10^1$ | $A_{211} = -3.54274 \times 10^1$ | |
| $A_{112} = -2.42251 \times 10^1$ | $A_{212} = 7.21245 \times 10^1$ | |
| $A_{113} = 1.01370 \times 10^0$ | $A_{213} = -3.36718 \times 10^1$ | |
| $A_{114} = 5.84826 \times 10^1$ | $A_{214} = 2.69289 \times 10^2$ | |
| $A_{115} = -9.08200 \times 10^0$ | $A_{215} = -7.48934 \times 10^2$ | |
| $A_{116} = -1.47296 \times 10^2$ | $A_{216} = -5.54106 \times 10^2$ | |

$$\frac{(N-1)F^3}{N^2 R_1{}^3} = 0.97 \qquad \frac{(N-1)D}{NR_1} = 0.38$$

$$\frac{R_1}{R_2} = -0.61 \qquad \frac{t}{D + WD} = 0.37$$

$\Delta_1(10) = 0.3167 \qquad \Delta_2(10) = -0.0892$
$\Delta_1(9) = 0.2349 \qquad \Delta_2(9) = -0.0715$
$\Delta_1(7) = 0.1280 \qquad \Delta_2(7) = -0.0426$
$\Delta_1(5) = 0.0615 \qquad \Delta_2(5) = -0.0215$ -continued

| | |
|---|---|
| $\dfrac{\Delta_1(10)}{\Delta_2(10)} = -3.6$ | $\dfrac{\Delta_1(7)}{\Delta_2(7)} = -3.0$ |

EMBODIMENT 6

| | | |
|---|---|---|
| $F = 1.0$ | $NA = 0.53$ | $\beta = 0$ |
| $R_1 = 0.59193$ | $D = 0.72263$ | $N = 1.43569$ |
| $R_2 = -1.03914$ | $WD = 0.37661$ | |
| | $t = 0.39961$ | $N_t = 1.58$ |
| $K_1 = -1.27070 \times 10^{-1}$ | | $K_2 = -2.00084 \times 10^1$ |
| $A_{13} = -5.96319 \times 10^{-2}$ | | $A_{23} = -4.05698 \times 10^{-2}$ |
| $A_{14} = 3.42850 \times 10^{-1}$ | | $A_{24} = -4.79534 \times 10^{-1}$ |
| $A_{15} = -2.25199 \times 10^0$ | | $A_{25} = -2.52292 \times 10^{-1}$ |
| $A_{16} = 2.70576 \times 10^0$ | | $A_{26} = 7.07278 \times 10^0$ |
| $A_{17} = 1.90000 \times 10^{-1}$ | | $A_{27} = -1.11860 \times 10^0$ |
| $A_{18} = -3.67643 \times 10^0$ | | $A_{28} = -5.75458 \times 10^1$ |
| $A_{19} = -4.07877 \times 10^0$ | | $A_{29} = 7.39636 \times 10^1$ |
| $A_{110} = 2.71155 \times 10^0$ | | $A_{210} = 2.35295 \times 10^1$ |
| $A_{111} = 6.91291 \times 10^0$ | | $A_{211} = -4.76851 \times 10^1$ |
| $A_{112} = -3.28771 \times 10^1$ | | $A_{212} = 1.01832 \times 10^2$ |
| $A_{113} = 1.40871 \times 10^0$ | | $A_{213} = -5.09708 \times 10^1$ |
| $A_{114} = 8.81313 \times 10^1$ | | $A_{214} = 4.09648 \times 10^2$ |
| $A_{115} = 1.88778 \times 10^1$ | | $A_{215} = -9.32033 \times 10^2$ |
| $A_{116} = -1.95774 \times 10^2$ | | $A_{216} = -5.96090 \times 10^2$ |

| | |
|---|---|
| $\dfrac{(N-1)F^3}{N^2 R_1^3} = 1.02$ | $\dfrac{(N-1)D}{NR_1} = 0.37$ |
| $\dfrac{R_1}{R_2} = -0.57$ | $\dfrac{t}{D + WD} = 0.36$ |
| $\Delta_1(10) = 0.3283$ | $\Delta_2(10) = -0.0867$ |
| $\Delta_1(9) = 0.2414$ | $\Delta_2(9) = -0.0696$ |
| $\Delta_1(7) = 0.1307$ | $\Delta_2(7) = -0.0415$ |
| $\Delta_1(5) = 0.0626$ | $\Delta_2(5) = -0.0210$ |
| $\dfrac{\Delta_1(10)}{\Delta_2(10)} = -3.8$ | $\dfrac{\Delta_1(7)}{\Delta_2(7)} = -3.1$ |

EMBODIMENT 7

| | | |
|---|---|---|
| $F = 1.0$ | $NA = 0.53$ | $\beta = 0$ |
| $R_1 = 0.58504$ | $D = 0.69611$ | $N = 1.43569$ |
| $R_2 = -1.09048$ | $WD = 0.40177$ | |
| | $t = 0.37468$ | $N_t = 1.58$ |
| $K_1 = -1.44410 \times 10^{-1}$ | | $K_2 = -6.00000 \times 10^1$ |
| $A_{13} = -7.03088 \times 10^{-2}$ | | $A_{23} = -2.63826 \times 10^{-1}$ |
| $A_{14} = 6.28868 \times 10^{-1}$ | | $A_{24} = -4.77623 \times 10^{-1}$ |
| $A_{15} = -3.03118 \times 10^0$ | | $A_{25} = -4.74847 \times 10^0$ |
| $A_{16} = 2.86223 \times 10^0$ | | $A_{26} = 2.69878 \times 10^1$ |
| $A_{17} = 7.23837 \times 10^{-1}$ | | $A_{27} = 2.20067 \times 10^0$ |
| $A_{18} = -3.35720 \times 10^0$ | | $A_{28} = -1.51280 \times 10^2$ |
| $A_{19} = -7.03758 \times 10^{-1}$ | | $A_{29} = 1.42145 \times 10^2$ |
| $A_{110} = 6.75133 \times 10^0$ | | $A_{210} = 4.61816 \times 10^1$ |
| $A_{111} = -1.94489 \times 10^1$ | | $A_{211} = 1.37386 \times 10^2$ |
| $A_{112} = -3.69454 \times 10^1$ | | $A_{212} = -3.20966 \times 10^2$ |
| $A_{113} = 1.06451 \times 10^1$ | | $A_{213} = -1.14961 \times 10^2$ |
| $A_{114} = 2.35421 \times 10^2$ | | $A_{214} = 3.41135 \times 10^3$ |
| $A_{115} = -1.36762 \times 10^2$ | | $A_{215} = -6.64098 \times 10^3$ |
| $A_{116} = -2.23383 \times 10^2$ | | $A_{216} = 1.71520 \times 10^3$ |

| | |
|---|---|
| $\dfrac{(N-1)F^3}{N^2 R_1^3} = 1.06$ | $\dfrac{(N-1)D}{NR_1} = 0.36$ |
| $\dfrac{R_1}{R_2} = -0.54$ | $\dfrac{t}{D + WD} = 0.34$ |
| $\Delta_1(10) = 0.3373$ | $\Delta_2(10) = -0.0843$ |
| $\Delta_1(9) = 0.2463$ | $\Delta_2(9) = -0.0678$ |
| $\Delta_1(7) = 0.1327$ | $\Delta_2(7) = -0.0405$ |
| $\Delta_1(5) = 0.0635$ | $\Delta_2(5) = -0.0205$ |

-continued

| | |
|---|---|
| $\dfrac{\Delta_1(10)}{\Delta_2(10)} = -4.0$ | $\dfrac{\Delta_1(7)}{\Delta_2(7)} = -3.3$ |

EMBODIMENT 8

| | | |
|---|---|---|
| $F = 1.0$ | $NA = 0.53$ | $\beta = 0$ |
| $R_1 = 0.58907$ | $D = 0.72453$ | $N = 1.43569$ |
| $R_2 = -1.04875$ | $WD = 0.37486$ | |
| | $t = 0.39797$ | $N_t = 1.58$ |
| $K_1 = -1.27003 \times 10^{-1}$ | | $K_2 = -2.17119 \times 10^1$ |
| $A_{13} = -5.51762 \times 10^{-2}$ | | $A_{23} = -4.08925 \times 10^{-2}$ |
| $A_{14} = 3.44870 \times 10^{-1}$ | | $A_{24} = -4.85729 \times 10^{-1}$ |
| $A_{15} = -2.28707 \times 10^0$ | | $A_{25} = -2.57188 \times 10^{-1}$ |
| $A_{16} = 2.76793 \times 10^0$ | | $A_{26} = 7.20410 \times 10^0$ |
| $A_{17} = 2.07984 \times 10^{-1}$ | | $A_{27} = -1.14365 \times 10^0$ |
| $A_{18} = -3.71462 \times 10^0$ | | $A_{28} = -5.90006 \times 10^1$ |
| $A_{19} = -4.22487 \times 10^0$ | | $A_{29} = 7.64260 \times 10^1$ |
| $A_{110} = 2.82318 \times 10^0$ | | $A_{210} = 2.44134 \times 10^1$ |
| $A_{111} = 7.16839 \times 10^0$ | | $A_{211} = -4.96811 \times 10^1$ |
| $A_{112} = -3.44216 \times 10^1$ | | $A_{212} = 1.06470 \times 10^2$ |
| $A_{113} = 1.46476 \times 10^0$ | | $A_{213} = -5.37079 \times 10^1$ |
| $A_{114} = 9.28512 \times 10^1$ | | $A_{214} = 4.31854 \times 10^2$ |
| $A_{115} = 1.96579 \times 10^1$ | | $A_{215} = -9.88594 \times 10^2$ |
| $A_{116} = -2.10320 \times 10^2$ | | $A_{216} = -6.88877 \times 10^2$ |

| | |
|---|---|
| $\dfrac{(N-1)F^3}{N^2 R_1^3} = 1.03$ | $\dfrac{(N-1)D}{NR_1} = 0.37$ |
| $\dfrac{R_1}{R_2} = -0.56$ | $\dfrac{t}{D + WD} = 0.36$ |
| $\Delta_1(10) = 0.3320$ | $\Delta_2(10) = -0.0850$ |
| $\Delta_1(9) = 0.2434$ | $\Delta_2(9) = -0.0683$ |
| $\Delta_1(7) = 0.1315$ | $\Delta_2(7) = -0.0407$ |
| $\Delta_1(5) = 0.0630$ | $\Delta_2(5) = -0.0201$ |
| $\dfrac{\Delta_1(10)}{\Delta_2(10)} = -4.0$ | $\dfrac{\Delta_1(7)}{\Delta_2(7)} = -3.2$ |

Embodiments 5 to 8 of the present invention have been shown above, and the imaging performances thereof are shown in FIGS. 6 to 9. In the above-described Embodiments 5 to 8, when the thickness t of the recording carrier substrate is 1.2 mm, the focal length corresponds to the order of 2.9 mm to 3.2 mm, and is within the range of the aforementioned condition (1). Thus, the compactness and light weight of the objective lens which are the objects of the present invention, and further the compactness and light weight of the optical head can be achieved.

In the above-described Embodiments 5 to 8, as the glass material, use has been made of one having a refractive index $Nd = 1.43914$ for d-line and Abbe number $vd = 95.1$.

In the biaspherical objective lenses as shown in the above-described Embodiments 5 to 8, it is preferable that in addition to the above-mentioned conditions (1) to (4), the following conditions (18) and (19) be satisfied:

$$0.90 < \frac{(N-1)F^3}{N^2 R_1^3} < 1.15 \qquad (18)$$

$$-0.65 < \frac{R_1}{R_2} < -0.50 \qquad (19)$$

The condition (18) is for correcting spherical aberration and coma well in the tertiary area.

If the numerical value range of the condition (18) is departed from, the spherical aberration particularly of the first surface will become great, and aberration cannot be completely corrected by the aspherical term $\phi_1$ of the first surface.

The condition (19) is a condition for more satisfying chiefly the sine condition. In the present invention, together with the on-axis aberrations, the off-axis aberrations within a predetermined range, particularly coma, is corrected well, but if the range of the condition (19) is departed from, the isoplanatic condition will be remarkably lost, and this is not preferable. If the upper limit of this condition is exceeded, the radius of curvature of the first surface will become too small, and this leads to the disadvantages that negative spherical aberration occurs greatly and aberration correction becomes difficult and that the working distance W.D. becomes shorter and a difficulty in practical use arises.

In the biaspherical objective lenses of the present invention as shown in the above-described Embodiments 5 to 8, it is preferable that in addition to the above-mentioned conditions (1) to (4) and conditions (18) and (19), the following condition (20) be satisfied:

$$0.30 < \frac{t}{D + WD} < 0.40 \quad (20)$$

The condition (20) is concerned in the structure and size of the optical head, and if the lower limit value of this condition is exceeded, it will lead to the bulkiness of the optical head, and this is not preferable. If on the other hand, the upper limit value of this condition is exceeded, the objective lens and the recording carrier will come too close to each other, and this is not preferable in respect of the safety during the occurrence of unexpected vibration or the like.

From the viewpoints of aberration correction, it is preferable that in addition to the above-mentioned conditions (1) to (4), (18) and (19), the following conditions (21) and (22) be satisfied:

$$-4.5 < \frac{\Delta_1(10)}{\Delta_2(10)} < -3.0 \quad (21)$$

$$-4.0 < \frac{\Delta_1(7)}{\Delta_2(7)} < -2.5 \quad (22)$$

The conditions (21) and (22) are the ratios between the amount of asphericity of the first surface and the amount of asphericity of the second surface at 100% and 70%, respectively, of the effective diameter. These two conditions have been found out by converting the sharing of the amounts of aberration correction in the first and second surfaces into the ratio between the amounts of asphericity. By the ranges shown in these conditions being satisfied in addition to the above-mentioned conditions (1) to (4), (18) and (19), it is possible to make both of the on-axis imaging performance and the off-axis imaging performance better.

Or from the viewpoint of aberration correction, it is preferable that in addition to the above-mentioned conditions (1) to (4), (18) and (19), the following conditions (23) to (26) be satisfied, and it is more preferable that in addition the following conditions (27) to (30) be satisfied together.

$$0.30F < \Delta_1(10) < 0.35F \quad (23)$$

$$0.10F < \Delta_1(7) < 0.15F \quad (24)$$

$$-0.10F < \Delta_2(10) < -0.07F \quad (b\ 25)$$

$$-0.05F < \Delta_2(7) < -0.03F \quad (26)$$

$$0.20F < \Delta_1(9) < 0.28F \quad (27)$$

$$0.045F < \Delta_1(5) < 0.07F \quad (28)$$

$$-0.08F < \Delta_2(9) < -0.06F \quad (29)$$

$$-0.04F < \Delta_2(5) < 0 \quad (30)$$

The above-mentioned conditions (23) to (26) are conditions for determining the amounts of asphericity at 100% and 70% of the effective diameters of the first and second surfaces of the lens. Likewise, the conditions (27) to (30) are conditions for determining the amounts of asphericity at 90% and 50%, and together with the conditions (23) to (26), they disclose more preferable conditions for aberration correction.

If the upper limit values of the conditions (23), (24), (27) and (28) are exceeded, spherical aberration will become over and if conversely, the lower limit values of these conditions are exceeded, spherical aberration will become under and the on-axis performance will be deteriorated.

The conditions (25), (26), (29) and (30) are concerned chiefly in the correction of the off-axis aberrations. If the ranges shown in these conditions are departed from, the amount of occurrence particularly of coma will become great, and this is not preferable.

As described above, according to the present invention, there can be provided a biaspherical objective lens of short focal length suitable for use in an optical information recording-reproducing apparatus. That is, the adoption of the biaspherical objective lens according to the present invention ensures good on-axis and off-axis imaging performances and contributes greatly to the compactness and light weight of the lens.

Figure 10:
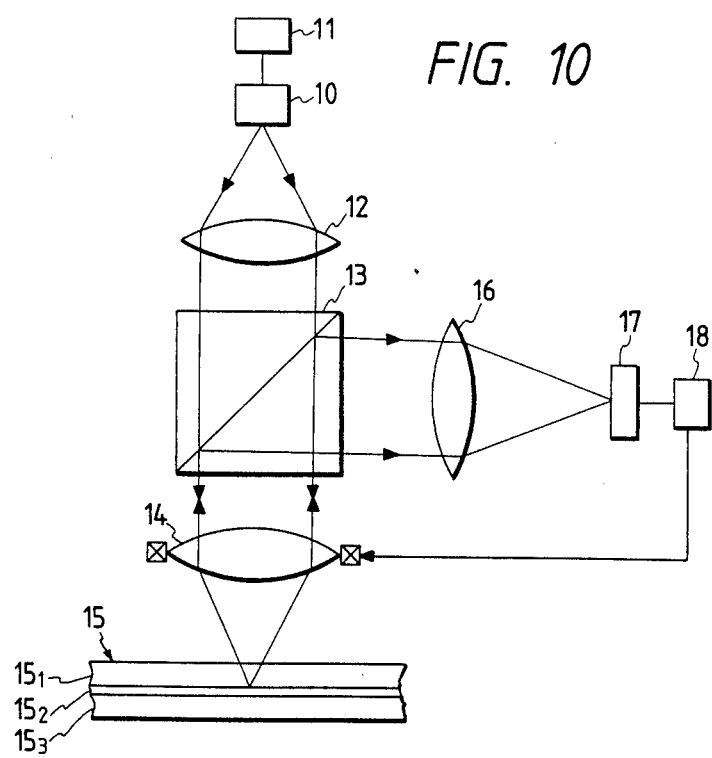
FIG. 10 is a schematic view showing an embodiment in which the biaspherical single lens according to the present invention is applied to an optical information recording-reproducing apparatus.
Figure 8A:
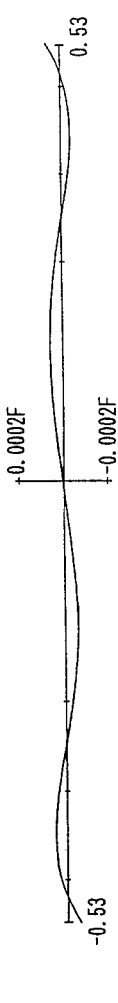
Figure 8B:
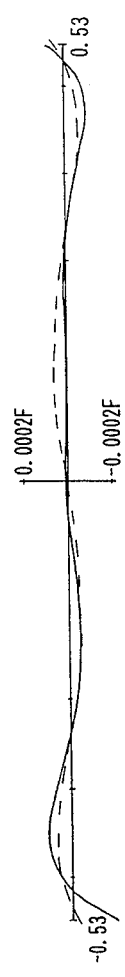
Figure 8C:
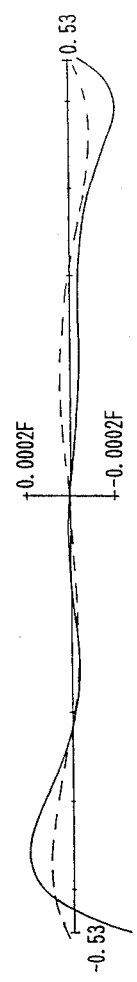
Figure 9A:
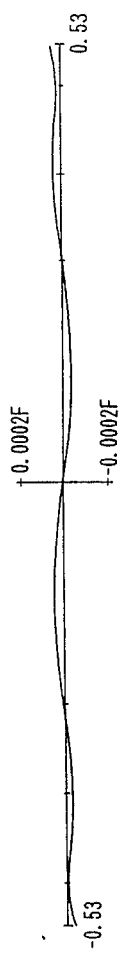
Figure 9B:
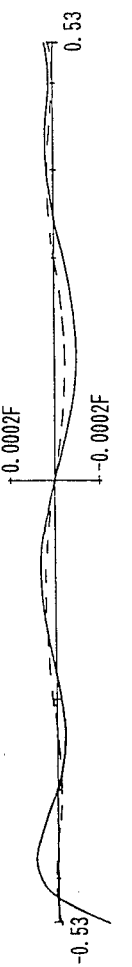
Figure 9C:
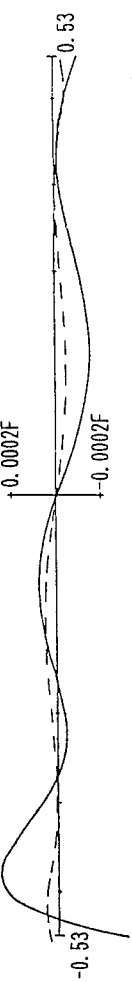

FIG. 10 is a schematic view showing an embodiment in which the biaspherical single lens of the present invention is applied to an optical information recording-reproducing apparatus. In FIG. 10, the reference numeral 10 designates a semiconductor laser which is a light source, the reference numeral 12 denotes a collimator lens, the reference numeral 13 designates a beam splitter, and the reference numeral 14 denotes an objective lens which is the biaspherical single lens of the present invention. The reference numeral 11 designates a laser driver which is driving means for modulating and driving the semiconductor laser on the basis of a signal from a signal processing unit, not shown. The reference numeral 15 denotes an optical information recording medium, the reference numeral $15_1$ designates the transparent protective layer of the optical information recording medium 15, the reference numeral $15_2$ denotes the information recording medium layer of the optical information recording medium 15, the reference numeral $15_3$ designates the support substrate of the optical information recording medium 15, the reference numeral 16 denotes a condensing lens, and the reference numeral 17 designates a photodetector for detecting auto focusing servo, auto tracking servo and an information signal.

A light beam emitted from the semiconductor laser 10 is collimated by the collimator lens 12, is transmitted through the beam splitter 13 and is imaged as a minute spot on the information recording medium layer 15₂ of the optical information recording medium 15 by the objective lens 14. The reflected light from the information recording medium layer 15₂ of the optical information recording medium 15 is again collimated by the objective lens 14. It is then reflected by the beam splitter 13 and arrives at the photodetector 17 via the condensing lens 16. The reference numeral 18 designates a focusing and tracking control unit.

On the basis of the signal detected by the photodetector 17 and in accordance with the command from the control unit 18, the objective lens 14 is moved in the direction of the optic axis thereof and/or a direction orthogonal to said direction by an actuator, not shown, whereby auto focusing servo and auto tracking servo are effected. By the auto focusing servo and auto tracking servo being effected, a minute spot can be applied to the information recording medium layer and highly accurate recording and/or reproduction of information can be accomplished.

If in the optical information recording-reproducing apparatus described above and shown in FIG. 10, the biaspherical single lens of the present invention is used as the objective lens, the light weight and compactness of the optical head can be achieved. A similar effect will also result from the use of the biaspherical single lens of the present invention as the collimator lens 12.

I claim:

1. A biaspherical single lens for an optical information recording-reproducing apparatus comprising a single lens forming an image through a substrate of thickness t and having its first and second surfaces both formed by an aspherical surface and in which when the distance from any point on the aspherical surface to the tangential plane of the vertex of the aspherical surface is X and the distance from said any point to the optic axis is H and the reference radius of curvature of the νth surface is $R_\nu$ and the cone constant of the νth surface is $K_\nu$ and the aspherical coefficient of the νth surface is $A_{\nu 1}$ (i=3, 4, ...), the aspherical surface is an aspherical surface expressed by the following equation and satisfies the following conditions (1), (2), (3) and (4):

$$X = \frac{H^2/R_\nu}{1 + \sqrt{1 - (1 + K_\nu)(H/R_\nu)^2}} + A_{\nu 3}H^3 + A_{\nu 4}H^4 + \ldots \quad (\nu = 1,2)$$

$$0.36 < \frac{t}{F} < 0.46 \quad (1)$$

$$0.60 < \frac{(N-1)F^3}{N^2 R_1^3} < 1.15 \quad (2)$$

$$0.30 < \frac{(N-1)D}{NR_1} < 0.45 \quad (3)$$

$$-0.65 < \frac{R_1}{R_2} < -0.26 \quad (4)$$

where F is the focal length of the aspherical single lens, D is the thickness on the optic axis of the aspherical single lens, and N is the refractive index of the aspherical single lens for the wavelength used.

2. A biaspherical single lens according to claim 1, further satisfying the following conditions (5) and (6):

$$0.60 < \frac{(N-1)F^3}{N^2 R_1^3} < 0.77 \quad (5)$$

$$-0.46 < \frac{R_1}{R_2} < -0.26 \quad (6)$$

3. A biaspherical single lens according to claim 1, further satisfying the following conditions (18) and (19):

$$0.90 < \frac{(N-1)F^3}{N^2 R_1^3} < 1.15 \quad (18)$$

$$-0.65 < \frac{R_1}{R_2} < -0.50 \quad (19)$$

4. An optical information recording-reproducing apparatus comprising:
a light source;
a photodetector, and
an optical system for directing a light beam from said light source to an information recording medium, and directing the light beam passed via said information recording medium to said photodetector;
said optical system comprising a biaspherical single lens which is a single lens forming an image through a substrate of thickness t and having its first and second surfaces both formed by an aspherical surface and in which the distance from any point on the aspherical surface to the tangential plane of the vertex of the aspherical surface is X and the distance from said any point to the optic axis is H and the reference radius of curvature of the νth surface is $R_\nu$ and the cone constant of the νthe surface is $K_\nu$ and the aspherical coefficient of the νth surface is $A_{84 i}$ (i= =3, 4, ...), the aspherical surface is an aspherical surface expressed by the following equation and satisfies the following conditions (1), (2), (3) and (4):

$$X = \frac{H^2/R_\nu}{1 + \sqrt{1 - (1 + K_\nu)(H/R_\nu)^2}} + A_{\nu 3}H^3 + A_{\nu 4}H^4 + \ldots \quad (\nu = 1,2)$$

$$0.36 < \frac{t}{F} < 0.46 \quad (1)$$

$$0.60 < \frac{(N-1)F^3}{N^2 R_1^3} < 1.15 \quad (2)$$

$$0.30 < \frac{(N-1)D}{NR_1} < 0.45 \quad (3)$$

$$-0.65 < \frac{R_1}{R_2} < -0.26 \quad (4)$$

where F is the focal length of the aspherical single lens, D is the thickness on the optic axis of the aspherical single lens, and N is the refractive index of the aspherical single lens for the wavelength used.

* * * * *

UNITED STATES PATENT AND TRADEMARK OFFICE
CERTIFICATE OF CORRECTION

PATENT NO. : 4,979,807
DATED : December 25, 1990
INVENTOR(S) : KAZUHIKO MATSUOKA It is certified that error appears in the above-identified patent and that said Letters Patent is hereby corrected as shown below:

Column 2
    Line 12, "the seek" should read --during the seek--.

Column 4
    Line 65, "well-balancedly" should read --well-balanced--.

Column 5
    Line 24, "reactive index" should read --refractive index--.
    Line 25, "carner" should read --carrier--.
    Line 39, "$\upsilon$ surface" should read --$\upsilon$th surface--.
    Line 40, "$\upsilon$the surface" should read --$\upsilon$th surface--.
    Line 45, "X +" should read --X =--.
    Line 61, "meridonal plane," should read --meridional plane,--.

Column 8
    Line 7, "84" should be deleted.
    Line 8, "d = 58.2." should read --$\upsilon$d = 58.2--.

UNITED STATES PATENT AND TRADEMARK OFFICE
CERTIFICATE OF CORRECTION

PATENT NO. : 4,979,807
DATED : December 25, 1990
INVENTOR(S) : KAZUHIKO MATSUOKA It is certified that error appears in the above-identified patent and that said Letters Patent is hereby corrected as shown below:

Column 10

Line 5, "1/3 $v(j)$," should read $--\Delta v(j),--$.

Column 14

Line 3, "(b 25)" should read --(25)--.

Line 20, "(26)." should read --(26),--.

Line 51, "is driving means" or --is a driving means--.

Column 15

Line 40, "$A_{v1}(i=3,$" should read $--A_{vi}(i=3,--$.

Column 16

Line 39, "$A_{841}(i==3, 4, ...)$" should read $--A_{vi}(i=3, 4, ...)--$.

Signed and Sealed this

Eighteenth Day of August, 1992

*Attest:*

DOUGLAS B. COMER

*Attesting Officer*     *Acting Commissioner of Patents and Trademarks*